(12) United States Patent
Palomo et al.

(10) Patent No.: US 6,405,126 B1
(45) Date of Patent: Jun. 11, 2002

(54) PRE-PROGRAMMED DESTINATIONS FOR IN-VEHICLE NAVIGATION

(75) Inventors: John Palomo, San Jose; James M. Janky, Los Altos, both of CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/177,707

(22) Filed: Oct. 22, 1998

(51) Int. Cl.$^7$ ................................................ G01C 21/26
(52) U.S. Cl. ........................ 701/202; 701/209; 340/990; 340/995
(58) Field of Search ................................. 701/200, 202, 701/207, 208, 209, 210; 73/178 R; 340/988, 990, 995

(56) References Cited

U.S. PATENT DOCUMENTS

| | | | | |
|---|---|---|---|---|
| 5,072,395 A | * | 12/1991 | Bliss et al. | 701/209 |
| 5,107,433 A | * | 4/1992 | Helldörfer et al. | 701/209 |
| 5,774,828 A | * | 6/1998 | Brunts et al. | 701/210 |
| 5,832,408 A | * | 11/1998 | Tamai et al. | 701/209 |
| 5,864,125 A | | 1/1999 | Szabo | 235/384 |
| 5,931,888 A | * | 8/1999 | Hiyokawa | 701/210 |
| 5,964,821 A | * | 10/1999 | Brunts et al. | 701/209 |
| 5,987,381 A | * | 11/1999 | Oshizawa | 701/210 |

* cited by examiner

*Primary Examiner*—Gary Chin
(74) *Attorney, Agent, or Firm*—Wagner Murabito & Hao LLP

(57) ABSTRACT

A system and method for finding an intended destination using an in-vehicle navigation system. Intended destinations are received and are coupled to an in-vehicle navigation system using various methods. In one embodiment, the intended destinations are stored on a magnetic strip that is disposed on the back of a plastic card. The plastic card is inserted into the in-vehicle navigation system where the data on the magnetic strip is read. Alternatively, a transmitter/receiver system is used to transmit the intended destinations to the in-vehicle navigation system. Once the intended destinations are coupled to the in-vehicle navigation system, the user is able to find an intended destination by selecting the desired intended destination from a list displayed by the in-vehicle navigation system. The in-vehicle navigation system then determines the current location of the vehicle and indicates how to find the intended destination using a moving map display and/or verbal instructions.

22 Claims, 8 Drawing Sheets

PRE-PROGRAMMED DESTINATIONS FOR IN-VEHICLE NAVIGATION

TECHNICAL FIELD

This invention relates to systems and methods for determining position. More specifically, the present invention relates to an apparatus and method for easily finding locations using a vehicle navigation system.

BACKGROUND ART

Vehicle navigation systems allow for ready determination of the location of a vehicle. Typically, vehicle navigation systems determine position using the constellation of satellites in the U.S. Global Positioning System (GPS). The GPS consists of a constellation of 24 orbiting satellites that transmit signals via microwave radio. These signals are be used by appropriately configured navigation system receivers to determine position.

Typically, navigation systems include one or more function keys that are operable to determine a user's position. Typically, the vehicle's position is displayed as an icon on a moving map display. Alternatively, the vehicle's position is displayed textually as a street address and may include a map reference. When a map reference is given, the user needs only look at an appropriate map, using the map reference to determine location.

Navigation systems are typically programmable so as to allow a user to preprogram desired destinations into the navigation system. Then, a user can find a preprogrammed destination by operating one or more selection mechanisms such as function keys, dials, etc. Alternatively, touch screens can be used, allowing a user to make a selection by touching the surfaces of the display.

Upon the selection of a preprogrammed destination, the navigation system typically determines position and displays a map that shows the then current position and the location of the preprogrammed destination. Typically, the then current position is represented by an icon of a vehicle and a second icon indicates the preprogrammed destination. Some navigation systems include processing algorithms for directing a user from the currently indicated position to the selected preprogrammed destination.

The task of programming in an intended destination is typically quite complex, requiring familiarity with the functions and input mechanism of the navigation system. Furthermore, different manufacturers use different programming methods and different makes of navigation systems have different input mechanisms. This makes use of the navigation system to locate an intended destination difficult.

Use of navigation systems to locate intended destinations is particularly difficult for users who are not familiar with the programming and operation of a particular brand of navigation system. This is particularly true with respect to vehicle rental customers.

Vehicle rental customers are often unfamiliar with the area in which the vehicle is rented. Therefore, vehicle rental customers are often in need of directions to various locations. In an effort to assist vehicle rental customers in locating desired locations, vehicle rental operations have recently begun to include in-vehicle navigation systems in vehicles. However, vehicle rental customers typically are unfamiliar with the programming and operation of the various different makes and models of in-vehicle navigation system. In addition, since vehicle rental customers typically only rent vehicles for a limited amount of time, they tend not to take the time to learn how to do the required programming. Thus, because the programming of intended destinations is time consuming and difficult, vehicle rental customers typically do not use the in-vehicle navigation system to locate destinations as intended by the manufacturer. Rather, rental customers simply use the indication of position and displayed map for determining their current location. These rental customers then use conventional methods (e.g. looking at a conventional paper map) for finding intended destinations. Alternatively, rental customers do not use the in-vehicle navigation system at all.

In vehicle rental operations, because customers are reluctant to use the in-vehicle navigation system for finding intended destinations, customers still ask for directions. This requires employees to direct the customer verbally, typically with reference to a printed map. Often the employee writes the instructions on the map for later use. When a customer must find multiple intended destinations, the employee must know the sequence of travel so as to determine an appropriate starting point for each set of instructions. However, after the customer has left the vehicle rental operation, the customer will frequently change the sequence of travel to intended destinations and/or add or delete intend destinations. This makes finding a particular intended destination difficult since the instructions start from a known position that is not necessarily the current position of the customer.

What is needed is an apparatus and method that will allow a user to easily determine how to travel to any of a number of known intended destinations. Also, a method and apparatus is needed for locating an intended destination that does not require the user to be familiar with the complexities of programming a particular model of in-vehicle navigation system.

DISCLOSURE OF THE INVENTION

The present invention provides a method and system for easily locating an intended destination. The method and apparatus of the present invention allows vehicle rental customers to easily locate an intended destination by selection of the intended destination using an in-vehicle navigation system.

The present invention is described with reference to a vehicle rental operation. However, the apparatus and method of the present invention can also be used in any number of other situations where it is desirable to allow a user to easily locate an intended destination.

In one embodiment, the system of the present invention includes a first computing device that is located at a vehicle rental operation. When a user desires to rent a vehicle, the user is asked to provide one or more intended destinations. That is, the user is asked to provide names of locations that the user may want to visit during the vehicle rental. The intended destinations are then input into the computing device. Typically this is done manually at the check-in counter by inputting the intended destinations using a standard computer keyboard.

A data set is then generated that indicates the intended destinations. The data set is then coupled to the in-vehicle navigation system of the vehicle rented by the vehicle rental customer. In one embodiment, a plastic card that includes a magnetic strip is used to couple the data set to the in-vehicle navigation system. That is, the data set is stored magnetically on the magnetic strip and the card is given to the rental customer. The rental customer then inserts the plastic card into an input device of the in-vehicle navigation system.

When the user desires to travel to an intended destination, the user operates the in-vehicle navigation system so as to select the desired intended destination. The in-vehicle navigation system then determines the position of the vehicle and uses the determined position of the vehicle and the selected intended destination to determine a travel path to the intended destination. The travel path is then indicated to the operator of the vehicle. In one embodiment, the travel path is indicated on a moving map that shows the directions to be taken with arrows. Also, verbal instructions can be given for indicating specific actions to be taken by the driver.

This allows a user who is unfamiliar with the complex programming and operation of a prior art in-vehicle navigation system to easily find intended destinations. There is no need for the user to read the instruction manual of the in-vehicle navigation system and/or otherwise learn how to program specific destinations into the in-vehicle navigation system. This is particularly useful for vehicle rental operations because vehicle rental customers typically require assistance in locating intended destinations. Also, the present invention is particularly useful for vehicle rental operations because vehicle rental customers typically do not rent a particular vehicle for a sufficient amount of time to justify familiarization with the operation and programming of an in-vehicle navigation system.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating," "incorporating," "calculating," "determining," "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Figure 1:
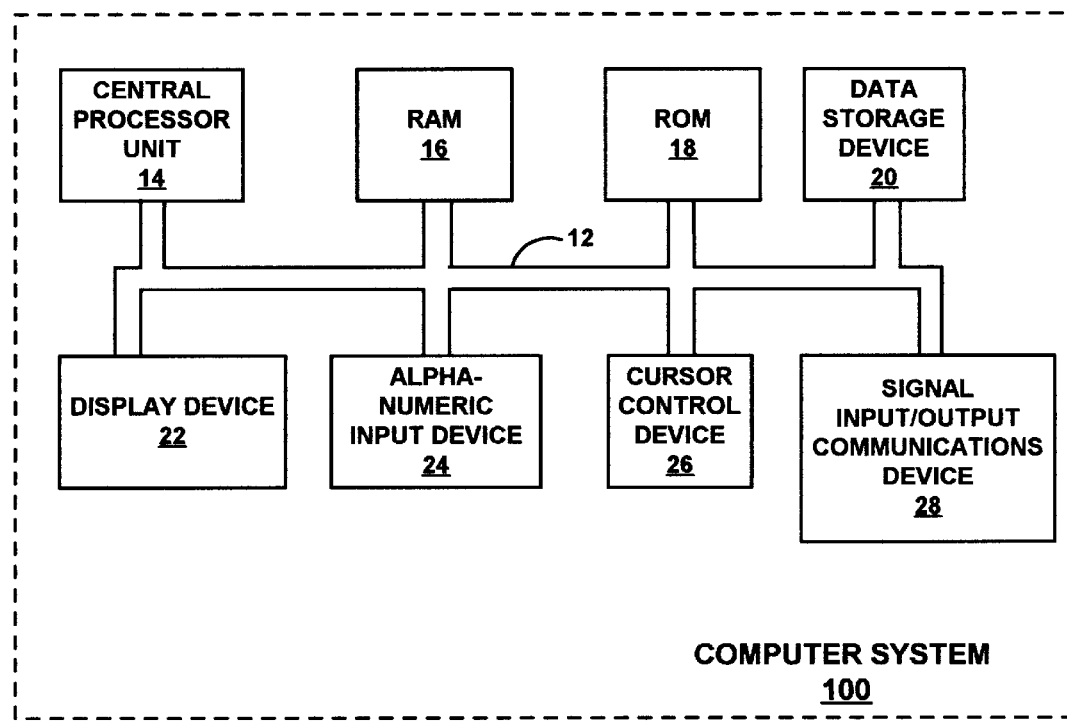
FIG. 1 is a schematic diagram illustrating an exemplary computer system used as part of a system for locating intended destinations in accordance with the present claimed invention.

FIG. 1 shows an exemplary computer system 100 that includes an address/data bus 12 for communicating information, a central processor unit 14 coupled to bus 12 for processing information and instructions. Signal input and output communications device 28 of computer system 100 is coupled to bus 12. In one embodiment, signal input and output communications device 28 includes a radio transmitter and/or a radio receiver for transmitting and/or receiving radio signals. Computer system 100 also includes data storage features such as random access memory 16 coupled to bus 12 for storing information and instructions for central processor unit 14, read only memory 18 coupled to bus 12 for storing static information and instructions for the central processor unit 14, and data storage device 20 (e.g., a magnetic or optical disk and disk drive) coupled to bus 12 for storing information and instructions. Computer 100 also includes display device 22 that is coupled to bus 12 for displaying information to an operator. Computer system 100 may also include an output communications port for transmitting the position to external devices. An alphanumeric input device 24 that may include alphanumeric and function keys is coupled to bus 12 for communicating information and command selections to central processor unit 14. Computer system 100 also includes cursor control device 26 that is coupled to bus 12 for communicating user input information and command selections to central processor unit 14.

Display device 22 of FIG. 1, utilized with computer system 100 of the present invention is a liquid crystal device, cathode ray tube, or other display device suitable for creating graphic images and/or alphanumeric characters recognizable to the user. Referring now to FIG. 1, cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Figure 2:
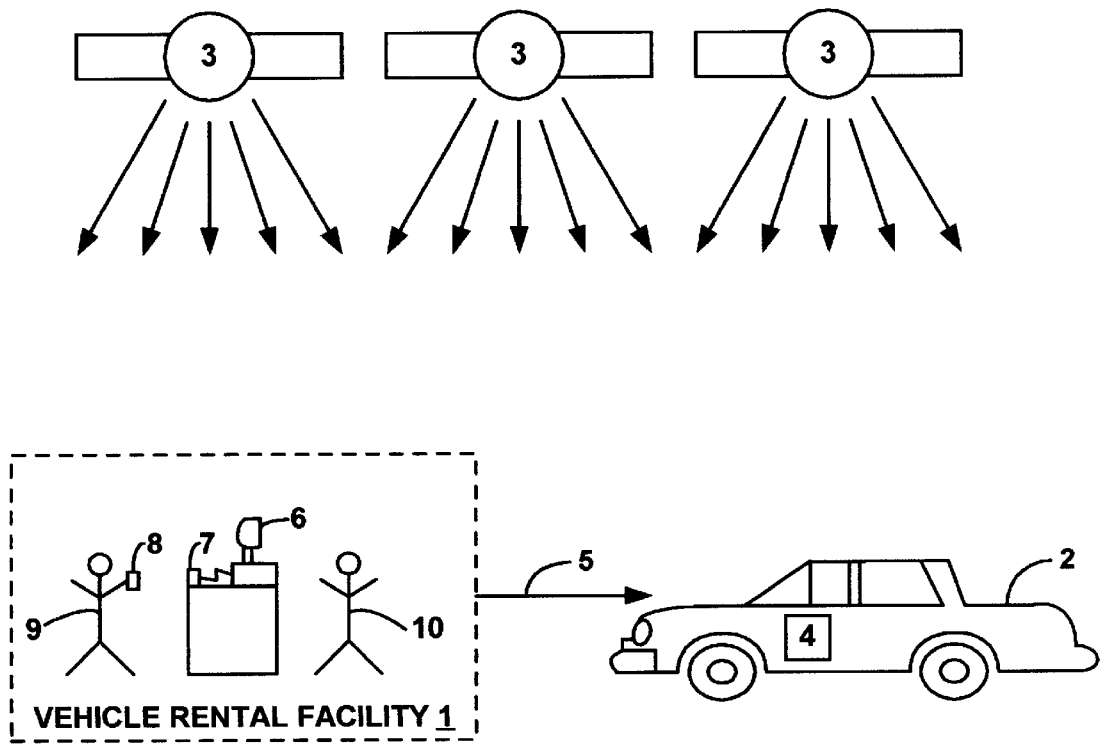
FIG. 2 is a schematic diagram of a system for locating intended destinations that is receiving signals from satellites of a SATPS in accordance with the present invention.

Referring now to FIGS. 2–6, the present invention is described with reference to a vehicle rental operation. Referring now to FIG. 2, a vehicle rental facility 1 is shown that rents a vehicle 2 to a customer, shown generally as customer 9. Vehicle 2 includes in-vehicle navigation system 4. When customer 9 desires to rent vehicle 2, the customer communicates verbally with an employee of the vehicle rental facility, shown generally as operator 10. Operator 10 then enters information pertaining to the rental into terminal 6. In one embodiment, terminal 6 is a computer system such as computer system 100 of FIG. 1.

Continuing with FIG. 2, in one embodiment, terminal 6 includes a data storage device 7 that stores data on storage media 8. In one embodiment, data storage media 8 is a card on which data is adapted to be stored magnetically and data storage device 7 is a device for storing data magnetically on storage media 8. In one embodiment, storage media 8 is a plastic card that has a magnetic strip disposed over it and data storage device 7 is a bar code printer. In one embodiment, storage media 8 is a plastic card such as are commonly used in copiers for payment of copying costs.

Continuing with FIG. 2, car 2 is shown to include in-vehicle navigation system 4 that is adapted to determine position using a Satellite Positioning System (SATPS) that includes satellites 3. In the present embodiment, reference to a positioning system, satellite positioning system, or SATPS herein refers to a Global Positioning System (GPS), to a Global Orbiting Satellite System (GLONASS), and to any other positioning system, including pseudolites and dead reckoning systems, that provides information by which an observer's position can be determined. The term "SATPS", as used herein, is intended to include pseudolite or equivalents of pseudolites, and the term "SATPS signals" and "SATPS data," as used herein, is intended to include SATPS-like signals and data from pseudolites or equivalents of pseudolites. Also, signals from other sources such as LORAN, Wide Area Augmentation System (WAS) satellites, etc. may be used to determine position. The SATPS may also provide information by which an observer's velocity and/or the time of observation can be determined.

Figure 3:
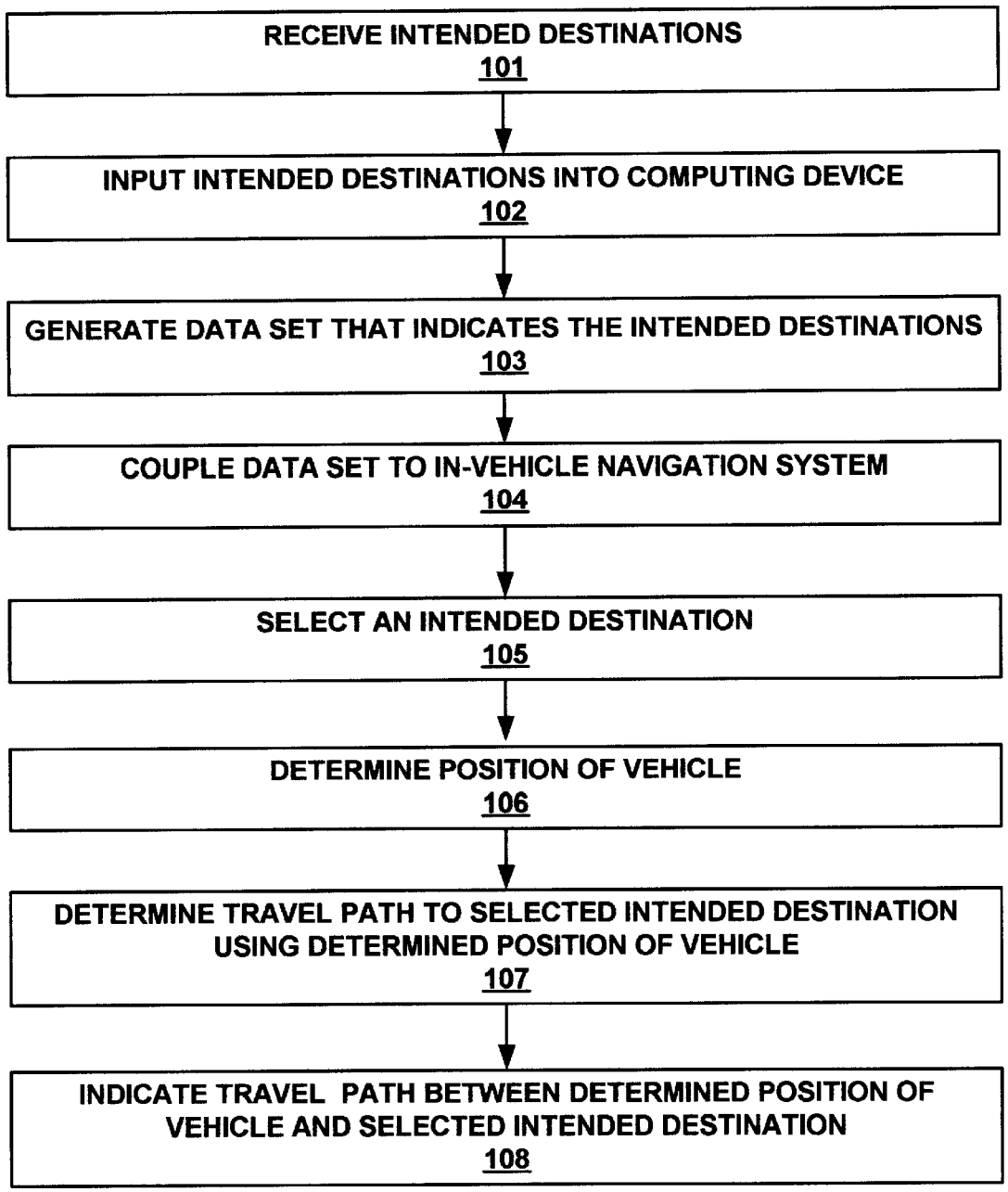
FIG. 3 is a flow chart illustrating a method for locating intended destinations in accordance with the present claimed invention.

FIG. 3 shows a method for locating an intended destination according to one embodiment of the present invention. First, one or more intended destinations are received as shown by step 101. In the embodiment shown in FIG. 2, as operator 10 is obtaining information from customer 9 pertaining to the vehicle rental, operator 10 asks customer 9 to list his intended destinations during the rental that he may want to find using in-vehicle navigation system 4. Customer 9 then verbally lists intended destinations.

Continuing with FIG. 3, the intended destinations are then input into a computing device as shown by step 102. In the embodiment shown in FIG. 2, the intended destinations are input into terminal 6 by typing the intended destinations on a keypad or other data input device coupled to terminal 6. When terminal 6 is a computer system such as computer system 100 of FIG. 1, the intended destinations are input by operation of alphanumeric input device 24.

Continuing with FIG. 3, the computing device then generates a data set that indicates the intended destinations as shown by step 103. In the embodiment shown in FIG. 2, terminal 6 generates a data set that includes the list of intended destinations. When terminal 6 is a computer system such as computer system 100 of FIG. 1, central processing unit 14 controls the operation of computer system 100 so as to generate a data set that includes the list of intended destinations. The data set describing intended destinations conforms in structure to the way in which the same intended destinations are described and chosen in the in-vehicle navigation system.

As shown by step 104 of FIG. 3, the data set is then coupled to an in-vehicle navigation system. In the embodiment shown in FIG. 2, data is coupled to the in-vehicle navigation system 4 via data storage device 7 and one or more storage media 8. That is, the data set is stored on storage media 8 that is then given to customer 9. Customer 9 then conveys storage media 8 to vehicle 2 and inserts storage media 8 into in-vehicle navigation system 4.

Figure 4A:
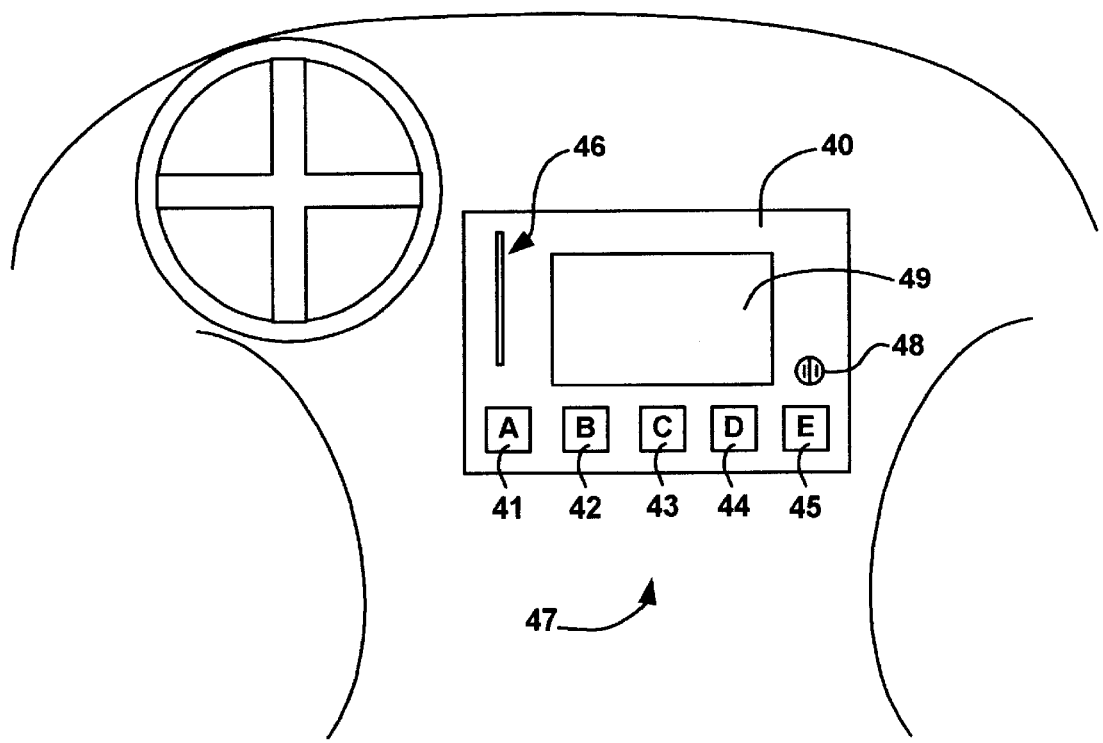
FIG. 4A is a diagram of the interior of a vehicle that includes an in-vehicle navigation system in accordance with the present claimed invention.

FIG. 4A shows an embodiment of an in-vehicle navigation system 40 that includes selection buttons 41–45 and slot 46. In one embodiment, slot 46 is adapted to receive storage media 8 of FIG. 2. In-vehicle navigation system 40 may be any of a number of known in-vehicle navigation systems such as, for example, a CARIN navigation system made by Phillips Electronics of Eidhoven, Netherlands.

Figure 4B:
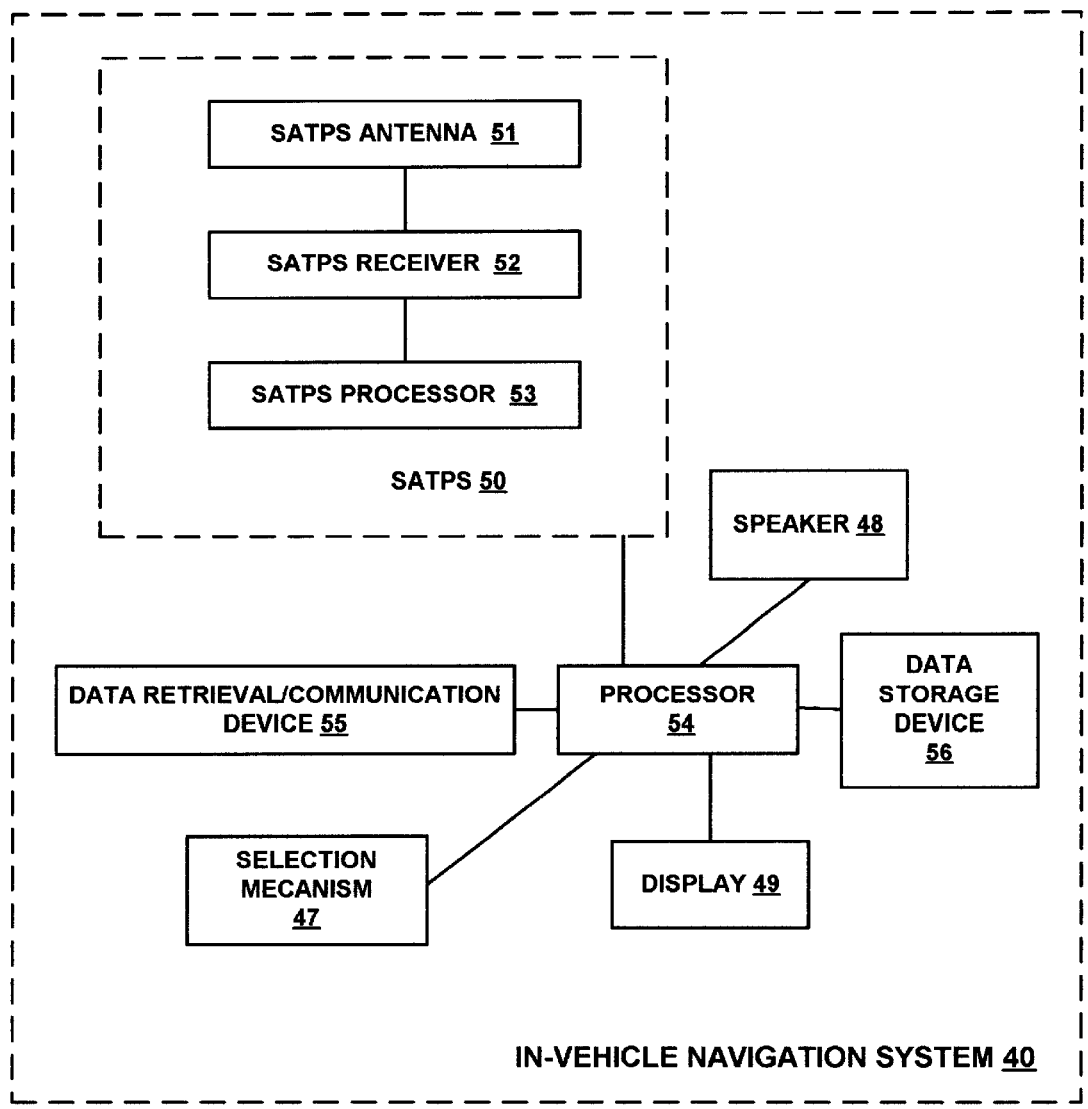
FIG. 4B is a diagram of the components of an in-vehicle navigation system in accordance with the present claimed invention.

FIG. 4B shows the various components of an exemplary in-vehicle navigation system 40. In-vehicle navigation system 40 includes processor 54. In one embodiment, processor 54 is a general-purpose microprocessor that operates in conjunction with one or more computer programs for controlling the operation of in-vehicle navigation system 40.

Referring to FIGS. 4A–4B, speaker 48 is operable to communicate audible instructions to a user. Display 49 visually couples information and instructions to a user. In one embodiment, display 49 is a liquid crystal display device. However, display device 49 may also be a cathode ray tube display or other type of display device suitable for displaying an image viewable to a user.

Referring to FIG. 4B, data storage device 56 provides for storing data. In one embodiment, data storage device 56 is a random access memory storage device. Alternatively, data storage device 56 may be any of a number of other types of systems that store data such as, for example, a CD ROM, a DVD, a tape storage device, a ZIP drive, a hard drive, etc. In one embodiment, a map database is stored in data storage device 56. The stored map database may be any of a number of known, commercially available map databases, such as, for example, an Etak map database, manufactured by Etak Corporation of Menlo Park, Calif. Alternatively, TIGER files, available through the U.S. Census Bureau as a map database or a software program such as, Map Info, manufactured by Map Info Corporation of Troy, N.Y., could be used.

Still referring to FIG. 4B, in-vehicle navigation system 40 includes SATPS 50 that is adapted to determine position using SATPS satellites. In one embodiment, SATPS is a commercially available position determination system such as a GPS position determination system, manufactured by Trimble Navigation, Ltd. of Sunnyvale, Calif. However, any of a number of other commercially available position determination systems could be used.

Referring back to FIG. 3, a user may operate the in-vehicle navigation system 40 so as to select an intended destination as shown by step 105. When the in-vehicle navigation 40 of FIGS. 4A–4B is used, selection of an intended destination is accomplished by pressing one of selection buttons 41–45 which correspond to intended destinations A–E that are displayed on display 49.

Continuing with FIG. 3, upon the selection of an intended destination, the in-vehicle navigation system then determines the position of the vehicle as shown by step 106. In the embodiment shown in FIG. 4B, signals from satellites of the SATPS are received by SATPS antenna 51 that couples the signals to SATPS receiver 52. SATPS receiver 52 demodulates SATPS signals that are then coupled to SATPS processor 53. SATPS processor 53 uses the signals from satellites of the SATPS to determine position using any of a number of known methods. In one embodiment, the SATPS uses satellites of the GPS for determining position. A useful discussion of methods for determining position using satellites of the GPS is included in the reference *Global Positioning System: Theory and Application*, edited by Bradford W. Parkinson and James J. Spilker, American Institute of Aeronautics and Astronautics, Inc., Washington, D.C., which is incorporated herein as background material.

Referring now back to FIG. 3, travel path is determined, as shown by step 107, between the determined position of the vehicle and the intended destination selected in step 105. In the embodiment shown in FIG. 4B, travel path is determined by processor 54 using either a dedicated program or a commercially available mapping program. Depending on the sophistication of the program for determining travel path, factors such as time of day, number of lanes, etc may be considered. Many commercially available databases include programming for determining travel path. One such program is Map Info, manufactured by Map Info Corporation of Troy, N.Y., which computes travel path given a first position coordinate corresponding to the current location and a second position coordinate corresponding to the intended destination.

As shown by step 108 of FIG. 3, the in-vehicle navigation system then indicates one or more travel paths between the determined position of the vehicle and the intended destination selected in step 105. In the embodiment shown in FIGS. 4A–4B, the travel path is indicated by the display of a moving map that indicates the travel path. In one embodiment, the current location is indicated by an icon of a vehicle and the intended destination is indicated by another suitable icon, with the travel path indicated by one or more arrows, or by highlighting or coloring of the travel path.

In one embodiment, the in-vehicle navigation system displays a visible map that indicates the location of the vehicle and indicates the location of the selected intended destination. The display also indicates the travel path between the determined position of the vehicle and the selected intended destination. In one embodiment, the map display is a moving map display that indicates the position of the vehicle as the vehicle moves toward the selected intended destination. The indication may include highlighting the travel path, displaying written instructions, or displaying arrows.

Audible instructions can be used to indicate the travel path either solely or in addition to the indications on the visible display. In one embodiment, audible instructions indicate actions to be taken for following the travel path such as, for example, turn right, turn left, etc. In the embodiment shown in FIGS. 4A–B, speaker 48 emits audible instructions generated by processor 54.

Referring to FIG. 4B, selection mechanism 47 that is coupled to processor 54 allows a user to select a desired destination. In the embodiment shown in FIG. 4A, selection mechanism 47 includes buttons 41–45.

Figure 5:
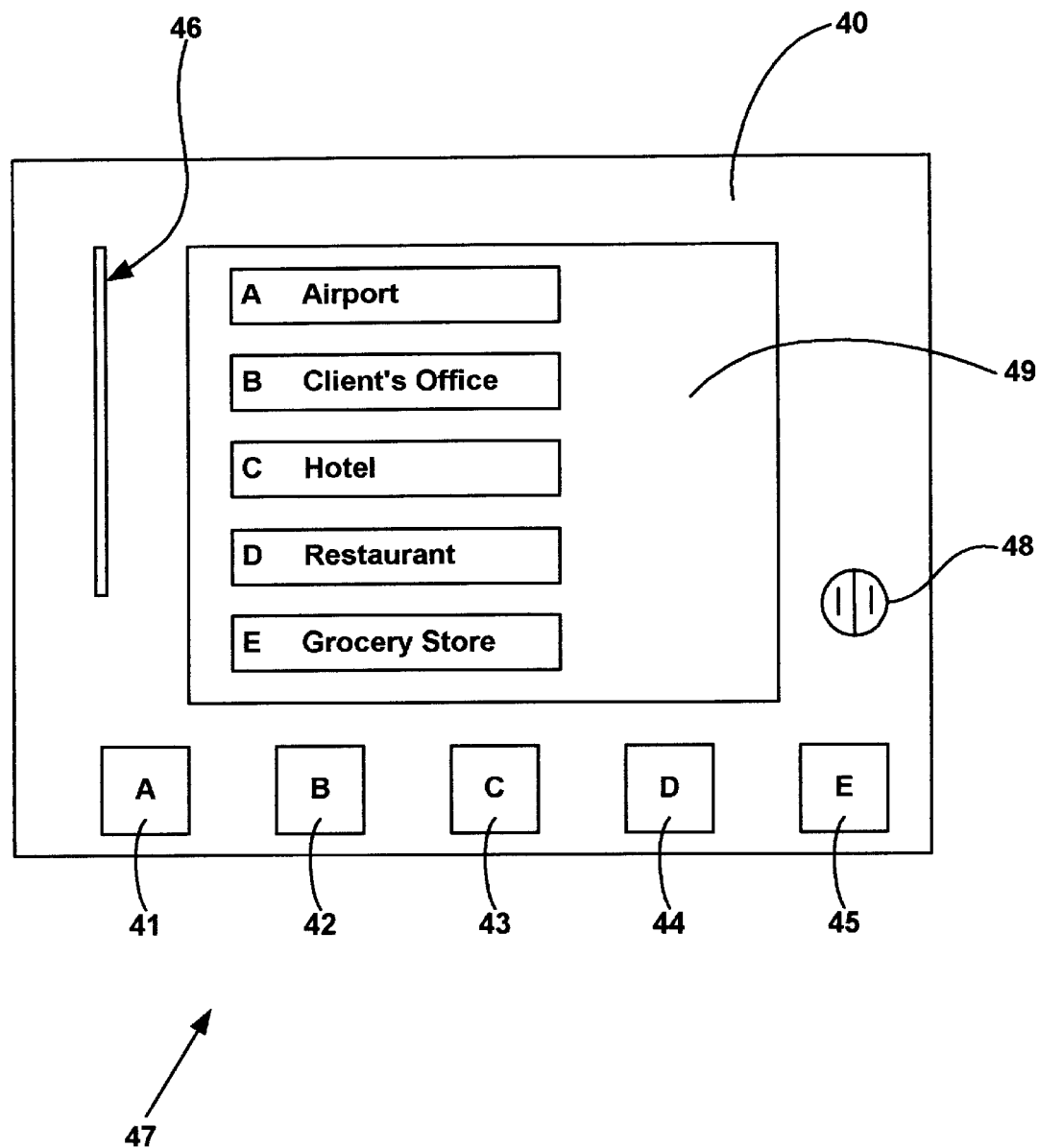
FIG. 5 is a diagram of an exemplary image displayed on the display of an in-vehicle navigation system in accordance with the present claimed invention.

Referring now to FIG. 5, an exemplary display that lists examples of intended destinations is shown. The intended destinations include A: Airport, B: Client's Office, C: hotel, D: Restaurant and E: Grocery Store. In order to select a desired destination, the user simply touches one of buttons 41–45 to select the desired intended destination. For example, in order to be directed from the user's current location to the airport, the user needs only to press button 41, marked as button "A."

In an alternate embodiment, selection mechanism 47 is a touch screen. In such an embodiment, a user selects a desired intended destination (step 105) by touching the display. That is, the user touches the region of the display that indicates the desired destination. For example if the hotel is the desired destination, the user touches the display at the block marked as "C Hotel."

Figure 6:
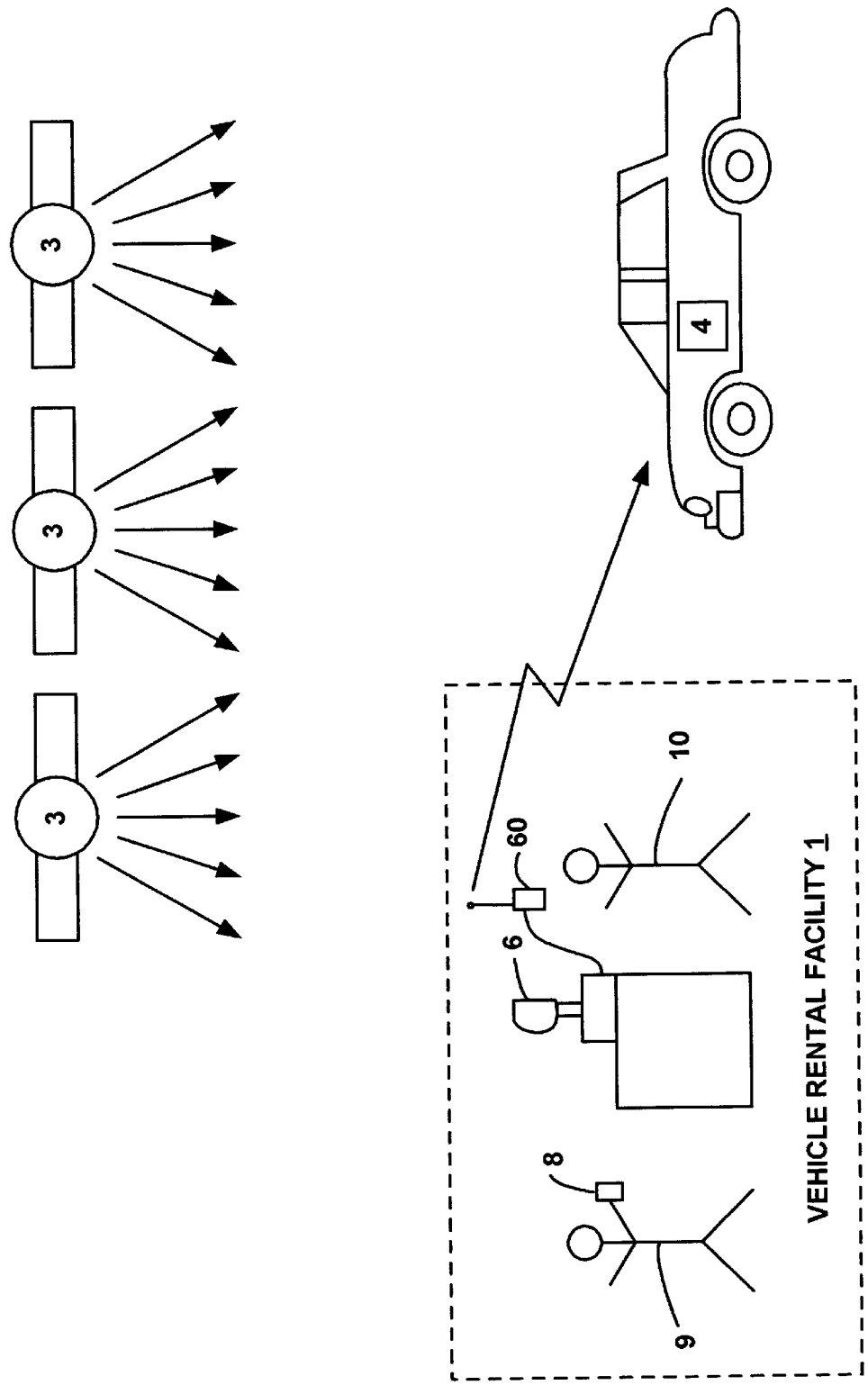
FIG. 6 is a schematic diagram of a system for locating intended destinations that includes a transmitter and a receiver in accordance with the present invention.

Referring now to FIG. 6, in an alternate embodiment, the data set is coupled to the in-vehicle navigation system using a wireless transmitter such as wireless transmitter 60. In one embodiment, wireless transmitter 60 is a radio transmitter. In the embodiment shown in FIG. 4B, when wireless transmitter 60 is a radio transmitter, data retrieval/communication device 55 is a radio receiver. In one embodiment, transmitter 60 is a packet radio such as those made by Metricom, Inc., of Los Gatos, Calif.

Wireless transmitter 60 can couple data directly to in-vehicle navigation system 4 or can couple data through one or more communication networks such as, for example, a cellular radio network. When data is coupled through a communication network, downloading of additional intended destinations is facilitated. That is, once the customer has left the vehicle rental facility, the user may call the vehicle rental facility using a cellular telephone and request the download of additional intended destinations. These additional intended destinations are downloaded using the communication network (e.g. cellular radio network).

Referring still to FIG. 6, in one embodiment, data is relayed by an infrared transmitter receiver system such as is currently found in computer to printer data transfer systems, and manufactured by Hewlett Packard of Palo Alto, Calif. That is, wireless transmitter 60 is an infrared transmitter and data retrieval/communication device 55 is an infrared receiver.

In yet another embodiment, a floppy disk is used as a storage media. Referring now to FIG. 2, in such an embodiment, data storage device 8 is a floppy disk, data storage device 7 is a disk drive capable of writing data to a floppy disk and data retrieval/communication device 55 of FIG. 4B is a disk drive capable of reading a floppy disk. Alternatively, memory cards (e.g. a PCMCLA card that uses SRAM or flash memory), mobile data terminals or data loggers can be used to couple data to an in-vehicle navigation system.

In FIGS. 2–4B, in-vehicle navigation system 40 is shown to include a dedicated data retrieval/communications device that is adapted to receive a storage media. However, the present invention is also well adapted for use with in-vehicle navigation systems that couple to devices capable of data input. For example, when a CD is used as a storage media in a vehicle having a CD player, the in-vehicle navigation system may be coupled to the vehicle's CD player. The vehicle's CD player may then be used for coupling a data set to the in-vehicle navigation system. The vehicle's CD player may also be used to input a map database and/or programs for processing map data. Similarly, tape players, DVD players, etc. may be coupled to an in-vehicle navigation system.

Figure 7:
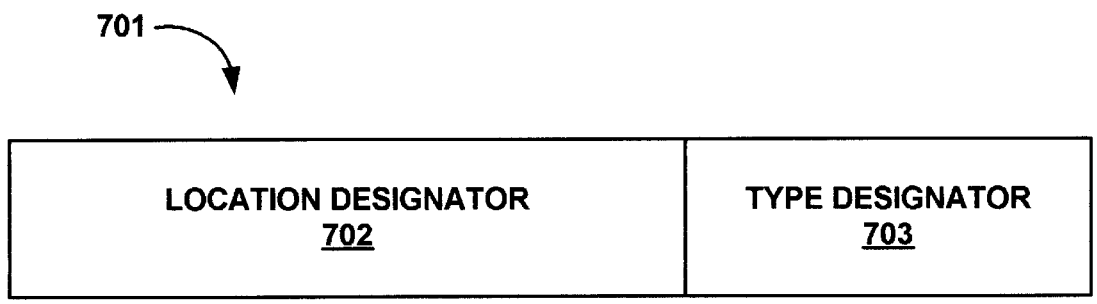
FIG. 7 is a diagram showing the format of a location code in accordance with the present invention.

In one embodiment, intended designations are input as location codes. That is, in the embodiments shown in FIG. 3, step 101 includes the entry of a location code. The location code is typically entered manually using a standard keypad (with the operator determining the correct location code). However, other methods such as voice recognition methods may also be used (e.g., a customer may verbally input spoken desired destinations with a speech processor converting the spoken desired destinations into location codes). FIG. 7 shows an exemplary location code 701. In one embodiment, location code 701 includes a location designator 702 and a type designator 703. The use of a location code 701 allows an operator to easily and quickly enter commonly used intended destinations such as, for example, the airport, the vehicle rental facility, hotels, restaurants, etc.

Continuing with FIG. 7, in one embodiment, one digit of the location code 701, referred to as the type designator 703, indicates the type of location. In one embodiment, type designators include "H" for hotels, motels, and other lodging establishments, "R" for restaurants, "A" for airports, "B" for businesses, "P" for parks and other similar facilities, "L" for libraries, "M" for museums and "I" for individual residences and other, infrequently used locations.

Referring still to FIG. 7, in one embodiment, the location code 701 includes a location designator 102 that is a three digit code that identifies a particular location. In one embodiment, the location designator 702 uses letters or numbers that allow for easy identification of the location. In one embodiment, airports are identified using three digit codes that are currently used by the Federal Aviation Association (FAA) and airlines for airport identification (e.g., SFO for San Francisco, SJC for San Jose, Calif. and DFW for Dallas/Fort Worth). Thus, for example, the full location code for San Francisco is SFOA. Similarly, the location code for San Jose, Calif. is SJCA and DFW for Dallas/Fort Worth is DFWA.

Still referring to FIG. 7, the location designator 702 for other locations of interest are assigned such that the letters or numbers of each particular location designator 702 indicates the location in much the same way as airport identification codes identify particular airports. Thus, for example, to identify the downtown Hyatt Hotel, a location designator 702 such as, for example HYD is used, giving a location code of HYDH. Other examples include KEL for Kelli's restaurant (giving a location code of KELR), MMA for the Modern Museum of Art (giving a location code of MMAM), etc.

Continuing with FIG. 7, less frequently used destinations or unique destinations such as street addresses and the location of individual residences may be entered into the computer and assigned a location code 701 while the customer is waiting. This allows for repeat customers to use the system and methods of the present invention to their benefit. That is, repeat travelers that have used the system and methods of the present invention will have information stored in the database (in the form of location codes 701) that can be easily accessed on subsequent rentals. In one embodiment, location codes 701 for less frequently used destinations or unique destinations such as street addresses are numerically indicated (e.g. 001, 002 . . . 999) with "I" as a type code (e.g., 001I, 002I . . . 999I). Alternatively, four digit numerical codes are used to identify less frequently used destinations or unique destinations such as individual residences (e.g., 0001, 0002 . . . 9999). Alternatively, a combination of numbers and letters are used.

Alternatively, other designators and systems that identify particular locations may be used such as, for example, street addresses, numbers, etc., either exclusively or in conjunction with the use of location codes. Also, the location codes of the present invention may have more or fewer characters as is required by a particular location. Also, the present invention is well adapted for use with other conventions for identifying locations.

Though the present invention is described with reference to use in a vehicle rental operation, the present invention is well adapted for use in other applications. For example, the present invention is well adapted for use in pickup and delivery trucks, couriers, long haul trucks, taxis, public safety operations, etc.

The methods and apparatus of the present invention are also well suited for coupling desired information to a user such as, mapping information, GPS related data, and/or promotional data. Mapping information may include extensions to the mapping database that may be coupled to the in-vehicle navigation system when the user requests an intended destination outside of the usual service area. GPS related data can include a download of the current GPS almanac for facilitating fast acquisition of signals from GPS satellites. Promotional destinations may include advertisements of local restaurants, hotels, amusements, etc. These promotional destinations may be given to all customers or may be tailored to the needs of a particular customer (e.g. including all seafood restaurants in an area when a customer's profile indicates that the customer likes seafood).

The present invention allows a user who is unfamiliar with the complex programming and operation of a prior art in-vehicle navigation system to easily find intended destinations. There is no need for the user to read the instruction manual of the in-vehicle navigation system and/or otherwise learn how to program specific destinations into the in-vehicle navigation system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for locating an intended destination using pre-programmed destinations input into an in-vehicle navigation system, said method comprising:

communicating verbally with a user located at a vehicle rental operation;

receiving a plurality of intended destinations from said user during said verbal communication with said user, said intended destinations including those destinations that said user intends to visit during rental of a vehicle;

inputting said plurality of intended destinations into a computing device located at said vehicle rental operation;

generating a data set that indicates said intended destinations;

coupling said data set to an in-vehicle navigation system located in said vehicle;

displaying images representing said intended destinations on a display of said in-vehicle navigation system during rental of said vehicle; and upon the selection of one of said displayed intended destinations, indicating the location of said selected intended destination.

2. The method of claim 1 wherein said coupling said data set to an in-vehicle navigation system further comprises:

coupling said data set to a radio transmitter; and transmitting said data set to said in-vehicle navigation system via radio transmission.

3. The method of claim 2 wherein said transmitting said data set to said in-vehicle navigation system via radio transmission further comprises transmitting said data set to said in-vehicle navigation system using a cellular radio network.

4. The method of claim 1 wherein said coupling said data set to an in-vehicle navigation system further comprises:

coupling said data set to an infrared transmitter; and transmitting said data set to said in-vehicle navigation system via infrared transmission.

5. The method of claim 1 wherein said coupling said data set to an in-vehicle navigation system further comprises:

coupling said data set to a magnetic card printer; and storing said data set on a magnetic card.

6. The method of claim 1 wherein said coupling said data set to an in-vehicle navigation system further comprises:

coupling said data set to a floppy disk drive; and storing said data set on a floppy disk.

7. The method of claim 1 wherein, upon the selection of one of said displayed intended destinations, a map is displayed that indicates the location of said vehicle and that indicates the selected intended destination, said display also indicating a travel path between the position of said vehicle and said selected intended destination.

8. In a computer system including a processor coupled to a bus, and a memory unit coupled to said bus for storing information, a computer-implemented method for locating an intended destination using pre-programmed destinations input into an in-vehicle navigation system, said method comprising:

communicating verbally with a user located at a vehicle rental operation;

receiving a plurality of intended destinations from said user during said verbal communication with said user, said intended destinations including those destinations that said user intends to visit during rental of a vehicle;

inputting said plurality of intended destinations into said computer system located in said vehicle rental operation;

generating within said computing system a data set that indicates said intended destinations;

coupling said data set to an in-vehicle navigation system located in said vehicle;

displaying images representing said intended destinations on a display of said in-vehicle navigation system during rental of said vehicle; and upon the selection of one of said intended destinations, indicating the location of said selected intended destination.

9. The computer implemented method of claim 8 wherein said coupling said data set to an in-vehicle navigation system further comprises:

coupling said data set to a radio transmitter; and transmitting said data set to said in-vehicle navigation system via radio transmission.

10. The method of claim 9 wherein said transmitting said data set to said in-vehicle navigation system via radio transmission further comprises transmitting said data set to said in-vehicle navigation system using a cellular radio network.

11. The computer implemented method of claim 8 wherein said coupling said data set to an in-vehicle navigation system further comprises:

coupling said data set to an infrared transmitter; and transmitting said data set to said in-vehicle navigation system via infrared transmission.

12. The computer implemented method of claim 8 wherein said coupling said data set to an in-vehicle navigation system further comprises:

coupling said data set to a magnetic card printer; and storing said data set on a magnetic card.

13. The computer implemented method of claim 8 wherein said coupling said data set to an in-vehicle navigation system further comprises:

coupling said data set to a floppy disk drive; and storing said data set on a floppy disk.

14. For a vehicle rental operation, a method for directing a customer to a desired location comprising:

communicating verbally with a user located at a vehicle rental operation;

receiving a plurality of intended destinations from said user during said verbal communication with said user, said intended destinations including those destinations that said user intends to visit during rental of a vehicle;

inputting said plurality of intended destinations into a computing device located at said vehicle rental operation;

generating within said computing device a data set that indicates said intended destinations, said data set not including destinations other than said intended destinations;

coupling said data set to said in-vehicle navigation system located in said vehicle;

displaying images representing said intended destinations on a display of said in-vehicle navigation system during rental of said vehicle, said display not including the display of destinations other than said intended destinations; and upon the selection of one of said displayed intended destinations, indicating the location of said selected intended destination.

15. The method of claim 14 wherein said coupling said data set to said in-vehicle navigation system further comprises:

coupling said data set to a radio transmitter; and transmitting said data set to said in-vehicle navigation system via radio transmission.

16. The method of claim 14 wherein said coupling said data set to said in-vehicle navigation system further comprises:

coupling said data set to an infrared transmitter; and transmitting said data set to said in-vehicle navigation system via infrared transmission.

17. The method of claim 14 wherein said coupling said data set to said in-vehicle navigation system further comprises:

coupling said data set to a magnetic card printer; and storing said data set on a magnetic card.

18. The method of claim 14 wherein said coupling said data set to said in-vehicle navigation system further comprises:

coupling said data set to a floppy disk drive; and storing said data set on a floppy disk.

19. The method of claim 14 wherein a best travel path between a determined position of said vehicle and said selected intended destination is indicated by a moving map display, said moving map display indicating the position of said vehicle as said vehicle moves toward said intended destination.

20. The method of claim 19 wherein one or more arrows are displayed that indicate a travel path between said position of said vehicle and said selected intended destination.

21. The method of claim 19 wherein audible instructions are used to indicate actions to be taken for following a travel path between said position of said vehicle and said selected intended destination.

22. The method of claim 21 further comprising:

entering a location code into a said computing device, said location code indicating an intended destination.

* * * * *